(12) United States Patent
Narasimhan et al.

(10) Patent No.: US 7,245,611 B2
(45) Date of Patent: Jul. 17, 2007

(54) METHOD AND PROCESS FOR SIGNALING, COMMUNICATION AND ADMINISTRATION OF NETWORKED OBJECTS

(75) Inventors: Anand Narasimhan, Berkeley, CA (US); Leo D'Angelo, Santa Clarita, CA (US)

(73) Assignee: j2 Global Communications, Hollywood, CA (US)

( * ) Notice: Subject to any disclaimer, the term of this patent is extended or adjusted under 35 U.S.C. 154(b) by 1041 days.

(21) Appl. No.: 10/374,629

(22) Filed: Feb. 26, 2003

(65) Prior Publication Data

US 2003/0169730 A1   Sep. 11, 2003

Related U.S. Application Data

(60) Provisional application No. 60/360,282, filed on Feb. 27, 2002.

(51) Int. Cl.
H04L 12/66     (2006.01)
(52) U.S. Cl. ................. 370/354; 370/352; 370/401; 370/392
(58) Field of Classification Search ............. None
See application file for complete search history.

(56) References Cited

U.S. PATENT DOCUMENTS

| | | | |
|---|---|---|---|
| 4,941,170 A | 7/1990 | Herbst | |
| 5,115,326 A | 5/1992 | Burgess et al. | |
| 5,193,110 A | 3/1993 | Jones et al. | |
| 5,333,266 A | 7/1994 | Boaz et al. | |
| 5,406,557 A | 4/1995 | Baudoin | |
| 5,479,411 A | 12/1995 | Klein | |
| 5,561,703 A | 10/1996 | Arledge et al. | |
| 5,568,536 A | 10/1996 | Tiller et al. | |
| 5,568,540 A | 10/1996 | Greco et al. | |
| 5,579,472 A | 11/1996 | Keyworth, II et al. | |
| 5,608,786 A | 3/1997 | Gordon | |
| 5,675,507 A | 10/1997 | Bobo, II | |
| 5,765,033 A | 6/1998 | Miloslavsky | |
| 6,020,980 A | 2/2000 | Freeman | |
| 6,073,165 A | 6/2000 | Narasimhan et al. | |
| 6,208,638 B1 | 3/2001 | Rieley et al. | |
| 6,301,609 B1 * | 10/2001 | Aravamudan et al. | 709/207 |
| 6,350,066 B1 | 2/2002 | Bobo, II | |

(Continued)

OTHER PUBLICATIONS

PCT International Search Report, dated Aug. 29, 2003 (International Application No. PCT/US03/06212—International Filing date Feb. 27, 2003).

*Primary Examiner*—Duc Ho
(74) *Attorney, Agent, or Firm*—Blakely, Sokoloff, Taylor & Zafman, LLP (57) ABSTRACT

Systems and processes for communication of messages between one or more networked objects on circuit and packet data networks are described. Specifically, means for representation of various communication types, including content description and disposition rules, delivery and routing descriptions and rules, conversion and translation descriptions and rules, and methods for interactions and for administration over one or more network types, through one or more communication protocol types, to one or more destination types are described. The delivery of messages and other communication over various communication protocols in addition to email is described. Methods for administering and managing rules for directing and transforming said messages and communications for purposes of routing or delivery to one or more specific destinations are also presented.

62 Claims, 7 Drawing Sheets

U.S. PATENT DOCUMENTS

| | | |
|---|---|---|
| 6,510,438 B2 | 1/2003 | Hasegawa |
| 6,564,321 B2 | 5/2003 | Bobo, II |
| 6,597,688 B2 | 7/2003 | Narasimhan et al. |
| 6,626,957 B1 * | 9/2003 | Lippert et al. ............... 715/513 |
| 2002/0087648 A1 * | 7/2002 | Petrovykh ................... 709/206 |
| 2003/0123431 A1 * | 7/2003 | Geck et al. .................. 370/352 |

* cited by examiner

METHOD AND PROCESS FOR SIGNALING, COMMUNICATION AND ADMINISTRATION OF NETWORKED OBJECTS

This application claims the benefit of the earlier filing date of provisional application No. 60/360,282 filed on Feb. 27, 2002.

BACKGROUND OF THE INVENTION

1. Field of the Invention

The various embodiments of the invention relate to the field of unified messaging through circuit and packet data networks.

2. Description of Related Art

Unified messaging has emerged to address the need for combining the delivery of different types of messages using a single interface. For example, U.S. Pat. No. 6,208,638, Rieley et. al., describes a method and apparatus for transmission and retrieval of information such as facsimile and audio messages over circuit and packet switched networks, specifically via the use of electronic mail. An incoming message (voice or fax) sent over a circuit switched network is transmitted over a packet switched network, by receiving an incoming call signal along with an inbound address, determining a user account and a final address on the packet network that are associated with the inbound address, and sending a processed form of the incoming message to an email box of the user. Another reference is U.S. Pat. No. 6,073,165, Narasimhan, et. al. which describes the use of filtering methods for processing electronic messages based on pre-defined filtering rules, and forwarding filtered messages to a receiving destination. Although the above described, patented techniques are quite effective in supporting a message delivery service, improvements are needed to provide a wider range of services.

SUMMARY

Systems and processes for communication of messages between one or more networked objects on circuit and packet data networks are described. Specifically, means for representation of various communication types, including content description and disposition rules, delivery and routing descriptions and rules, conversion and translation descriptions and rules, and methods for interactions and for administration over one or more network types, through one or more communication protocol types, to one or more destination types are described.

The delivery of messages and other communication over various communication protocols in addition to email is described. Methods for administering and managing rules for directing and transforming said messages and communications for purposes of routing or delivery to one or more specific destinations are also presented.

Protocols used here for the signaling, transport and delivery of messages and other communication over communication networks include electronic mail (SMTP, POP, IMAP, etc.), instant messaging protocols, session and signaling protocols (e.g. session initiation protocol or SIP) and transport over protocols such as TCP/IP. The use of distributed authoring and versioning (DAV) protocols is also described for message delivery. Authentication and network security techniques in general are used for the delivery of the messages and other communication.

In other embodiments of the invention, mark-up languages that determine the rules for disposition or presentation of messages or other communication between one or more networked objects are used (examples include HTML, XML, etc.). The use of representation methods for unified approaches to document handling, message and communication handling, signaling, routing, security, and other methods of disposition or handling of interactions and sessions as part of a successful communication transaction are described.

DETAILED DESCRIPTION

Figure 1:
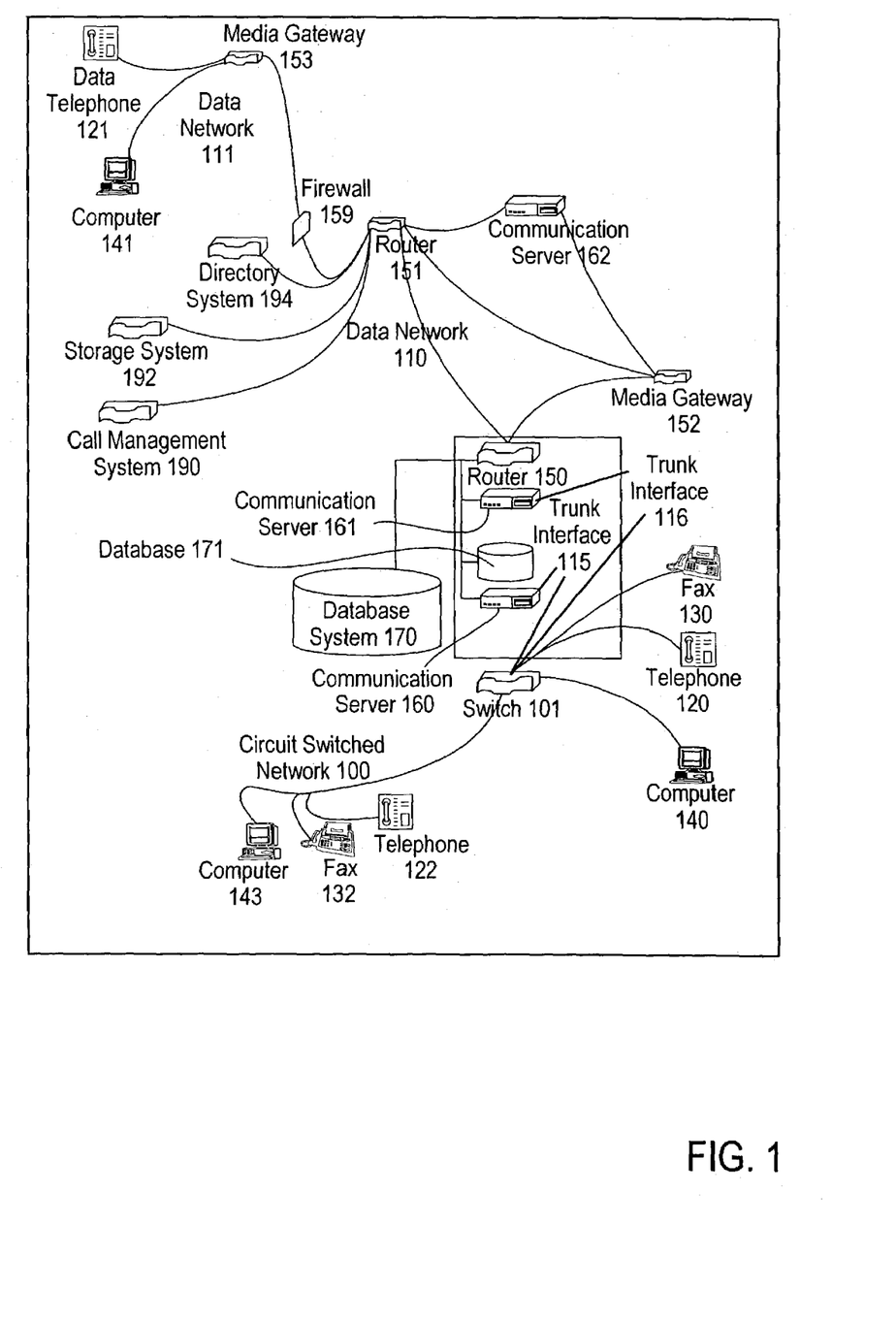
FIG. 1 shows a system for communication between networked objects, including an end-user interface device.

FIG. 1 illustrates a preferred embodiment of the invention, wherein end-user devices, including telephones 120, 122, data telephones 121, facsimile (fax) devices 130, 132, and computers 140, 141, 143, and other communication devices are connected to one or more networks, including circuit switched networks 100, data networks 110, 111 or other networks, via switching or routing elements that serve to direct and route data, these elements including circuit switches 101 or data network routers 150, 151. The system further comprises one or more communication servers 160, 161 that interface with one or more networks, such as circuit switched networks and data networks, through connections such as trunk interfaces 115, 116 or other physical or logical connections. In the preferred embodiment, interface 115 is an E1 or T1 interface capable of carrying several simultaneous data or voice connections. Such connections are well known in the prior art. Further, the system of the present invention includes databases 170, 171, call management system units 190, media gateways 152, 153, storage systems 192, directory systems 194, and security systems for protection of data across networks, including systems such as firewalls 159. In the preferred embodiment, storage system 192 is an email storage system, or other data storage and archival system, physically or logically accessible over a data network, through standard network protocols, including but not limited to SMTP, POP, and IMAP. Directory system 194 may be any standard or proprietary directory system that provides information accessible over a data network, said information including but not limited to user information, profiles, addresses, calendars, and accessible through a variety of protocols, including but not limited to LDAP.

Figure 2:
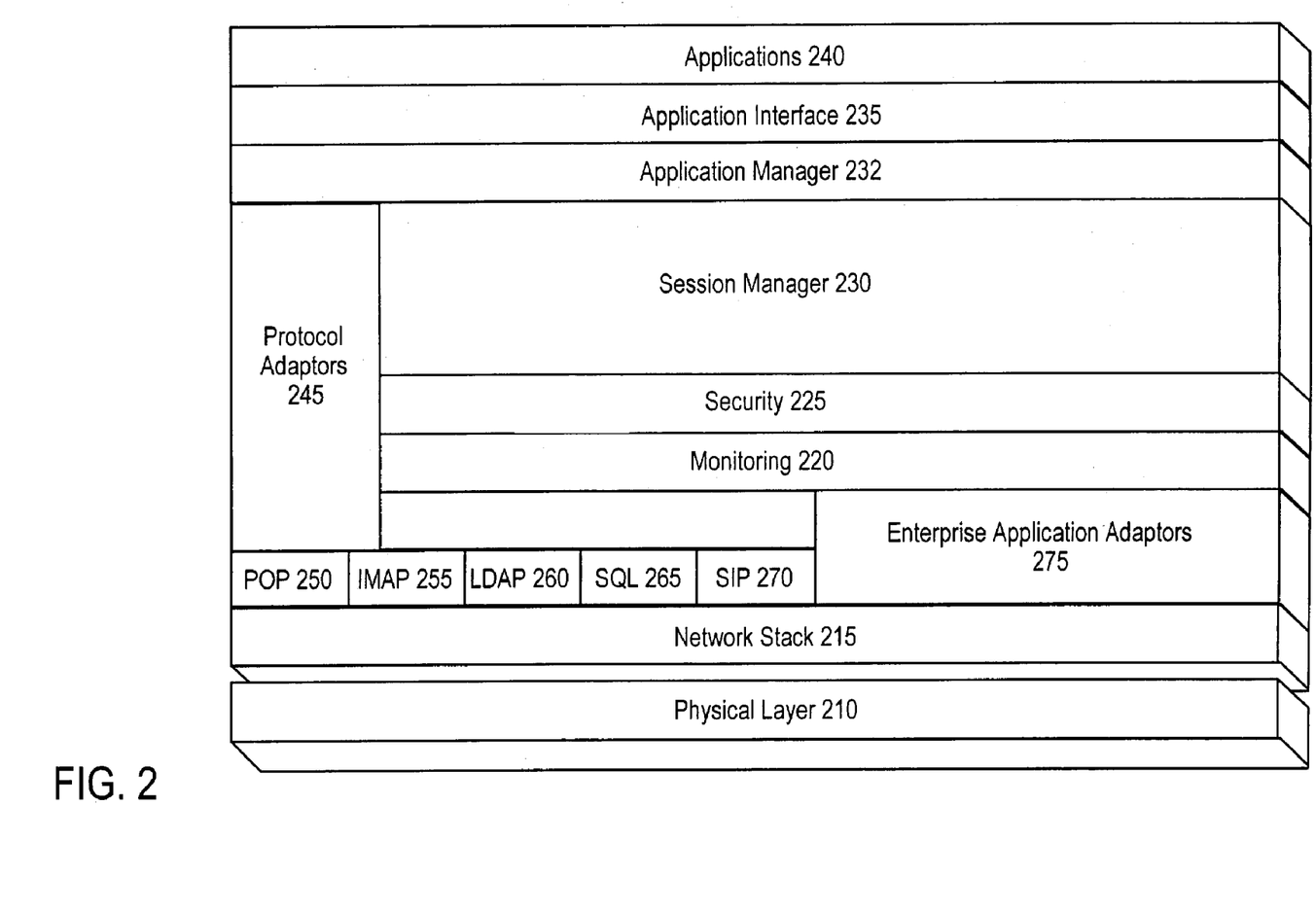
FIG. 2 shows an illustration of the elements of a preferred embodiment of an end-user interface device.

FIG. 2 describes the logical components of an end user device. Here, an end user uses application 240 to communicate or interact with other elements across a network, such as the ones shown in FIG. 1. Application Interface 235 may be a standardized interface that allows one or more applications to interact with the rest of the system components. Application Manager 232 performs the function of managing various applications, scheduling resources and connectivity with other elements of the system. Session Manager 230 is responsible for the management and administration of communication sessions, between one or more end user devices, or other elements of the system of the invention, a session being described as any communication or interaction, of a pre-specified or unspecified duration, structured or unstructured, supervised or unsupervised by one or more elements of the system of the present invention. Security unit 225 is responsible for handling of security for all aspects of communication, including signaling and data interchange between one or more elements of the invention, and being further responsible for various aspects of security, including but not limited to authentication, integrity, confidentiality, protection, and key management. Unit 225 may also interact with other security elements (not shown) accessible on a data network (110, 111). Monitoring unit 220 is responsible for the monitoring of various system elements, to ensure that performance metrics and other parameters that measure and ensure system performance are adhered to, and reported to locations that can further determine and administer their upkeep. Protocol adapters 245 include one or more interfaces to one or more protocols, standard or proprietary, that may be used for the exchange of signaling or data information across networks, and between similar or dissimilar end-users and other elements of the system of the present invention. These include, but are not limited to POP, IMAP, SMTP, LDAP, SQL, and SIP. Further, numerous applications are available in the art that further describe interfaces to these applications. Interfaces between these applications and the system of the invention are labeled as Enterprise Application Adapters 275. Network stack 215 describes these elements of the system that provide connectivity to a data network, through one or more communication protocols, for the exchange of signaling or other data information. Physical layer 210 describes the physical medium of the end-user interface, through which an end-user communicates.

Figure 3:
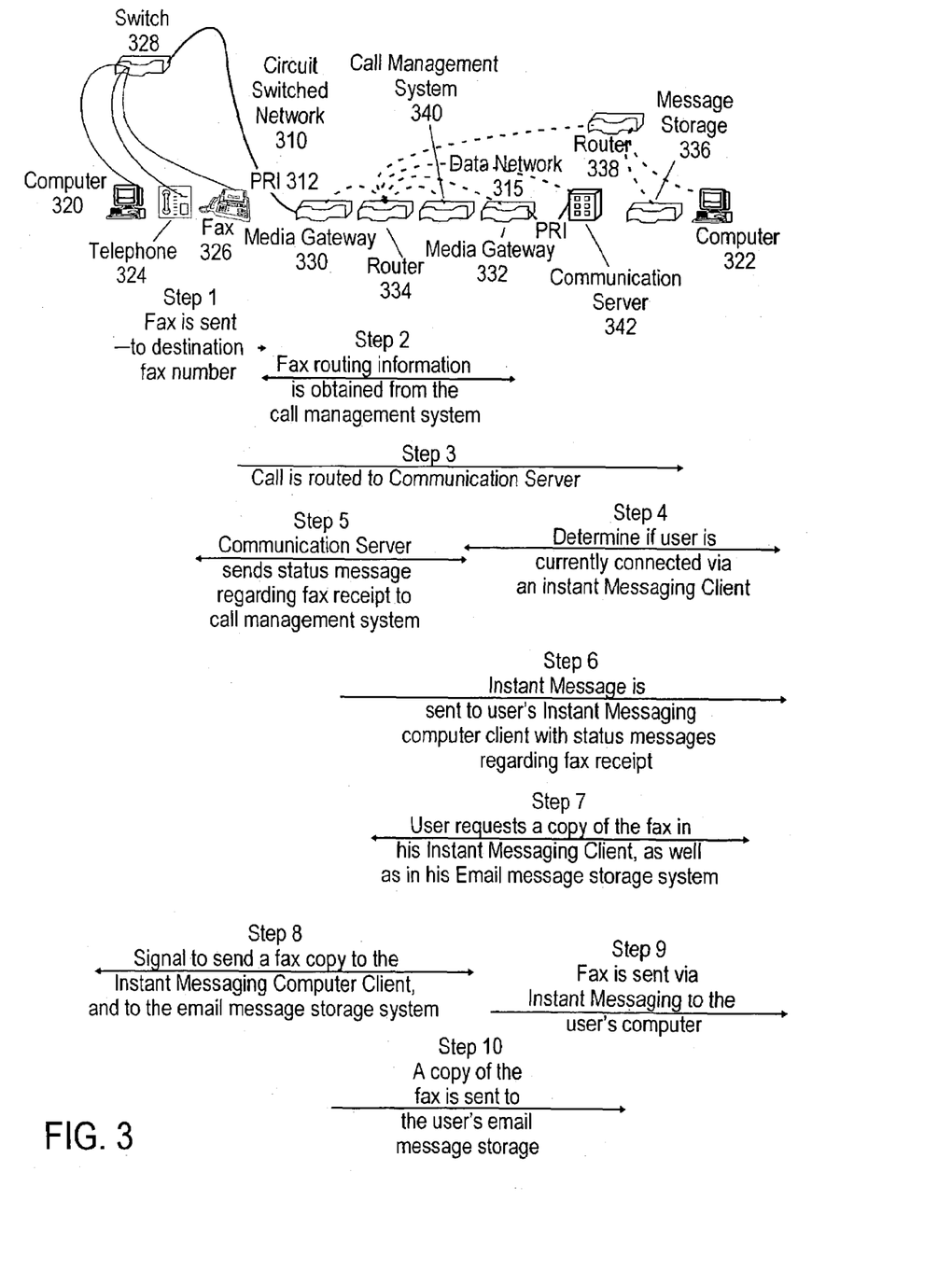
FIG. 3 illustrates the transport of facsimile messages to an end-user interface device or other object, via a multiplicity of transports, including electronic mail and instant messaging.

FIG. 3 illustrates an embodiment of the invention, wherein a fax message is sent through the various network elements, and communicated with one or more end-users. Here, fax machine 326 is used to initiate a telephone call through switching unit 328 connected to circuit switched network unit 310. This call is transmitted through trunk interface unit 312, to a media gateway 330. Unit 330 may first digitize the call signaling information (if not done already) and then sends the call signaling information to call management system 340. The system 340 authenticates the call as a valid call intended for a specified end user, e.g. a customer of a message delivery service that operates the system 340, based on an inbound address specified by the calling fax machine, which dialed a specific telephone number in order to place the telephone call. This inbound address is identified as being associated with or assigned to one or more specified end-users e.g., customers of the message delivery system.

Unit 340 also determines where the incoming call should be routed, for delivery to an end-user, or to one or more locations specified by an end-user, or through a system of defining rules. Once unit 340 has made a determination on the proper routing of the incoming call, this call is routed to a specified communication server 342 where it is processed. Simultaneously, or unrelated to these events, unit 340 also determines whether the end-user that is the intended recipient of the fax incoming call, is connected on one or more end-user devices that are capable of receiving the fax message, or any information pertaining to the fax. In an embodiment of the invention, unit 340 determines how an end-user is available, through an instant messaging client end-user device. Such an end-user can be available on computer unit 322 that is running an instant message client program. In that case, status messages pertaining to the receipt of the fax message may be sent to unit 322.

Unit 322, and in particular via the instant messaging client program, may then request further information pertaining to the received fax message, and may even further request a routing of the fax message to one or more other end-user devices. For example, the end-user may request that a copy of the fax be sent to his instant messaging client, along with an additional copy of the fax being sent to his email storage system. This request is sent to unit 340, which further instructs communication server 342 to send a copy of the fax message to unit 322, along with a further copy to message storage unit 336, which represents the email storage unit specified by the end-user.

Figure 4:
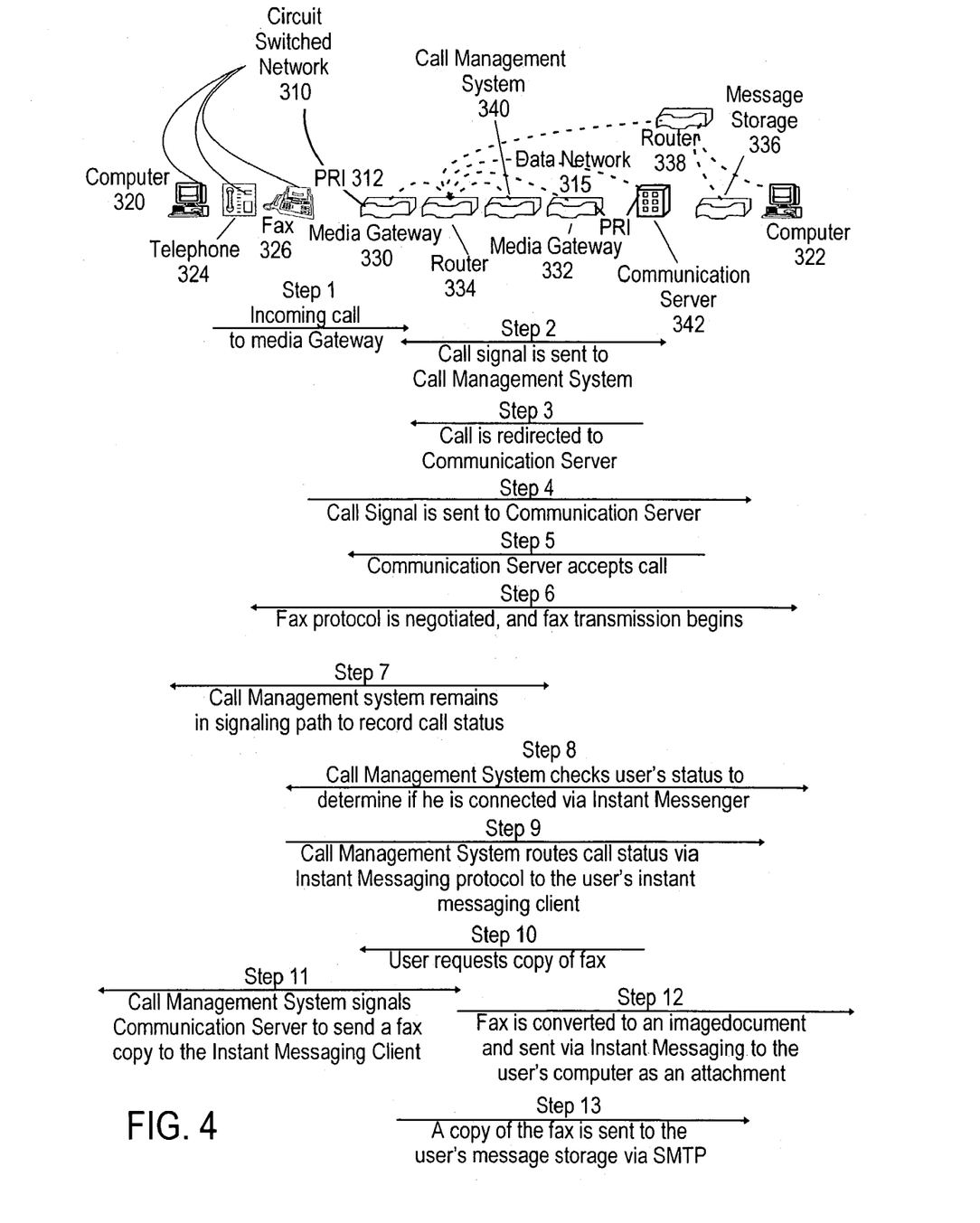
FIG. 4 illustrates the flow of signaling information between various elements of a preferred embodiment of the invention, for purposes of message delivery or disposition, routing, and handling of various aspects of communication between one or more end-users or elements of the invention.

In the process described by FIG. 3, a system of signaling makes it possible for the interchange of data. This signaling flow is shown in FIG. 4, illustrating the same example as in FIG. 3. Here, an incoming call from unit 326 causes an incoming call signal to be sent to unit 330, which further routes the information to call management system unit 340. Unit 340 determines the appropriate routing for the incoming call, and signals the media gateway unit 330 to redirect the incoming call to communication server unit 342. Unit 342 accepts the incoming call, and hence, communication is established between units 326 and 342, allowing the receipt of the fax message by unit 342. In this process, unit 340 remains on the path of the signaling information, and is aware of the status of the message being received.

Unit 340 may signal to one or more end-users to determine whether they are connected and available to receive messages or other communication. This signaling may be accomplished through one or more protocols, including the use of an instant messaging protocol. Through this process, unit 340 determines that unit 322 is available to receive messages. Hence, it further directs status messages pertaining to the received fax message to unit 322. Subsequently, unit 322 signals via an instant messaging protocol, to unit 340, requesting that a copy of the fax message be sent to it, and further requesting that a copy of the fax be sent to a specified email address. Unit 340 then instructs unit 342 to transmit a copy of the fax, via an instant messaging protocol, to unit 322. Further, it instructs unit 342 to send a copy of the fax message via SMTP to a message storage unit 336.

The process of signaling and communication described in the embodiment of FIG. 3 and FIG. 4 can be enhanced with the use of security methods, wherein, utilizing the unit 225 of FIG. 2, communication between one or more elements of the invention can be authenticated and encrypted. Further, within the network protocols that enable transmission of signals and data across a data network, such as implemented in the network stack 215 of FIG. 2, IPsec, a known set of protocols in the art, for network security, is overlaid upon the communication of FIG. 3 and FIG. 4 via unit 225. Communication between some or all elements within the data network can be secured through the use of such security methods.

Within the system of the invention, communication, messages or documents that are to be transmitted from one or more elements of the network to another sometimes require to be translated or modified, either in their content, or in their signaling methods, or otherwise encapsulated in a way that permits their transmission across one or more networks, protocols or other media. The embodiment described here permits such operations to be performed, wherein rules or other directives are interpreted by the call management system 190 of FIG. 1 or within the session manager 230 of FIG. 2, or the communication server 342 of FIG. 3 or FIG. 4. One or more representation languages described further below may also represent these translations, adaptations or encapsulations, or directives.

Figure 5:
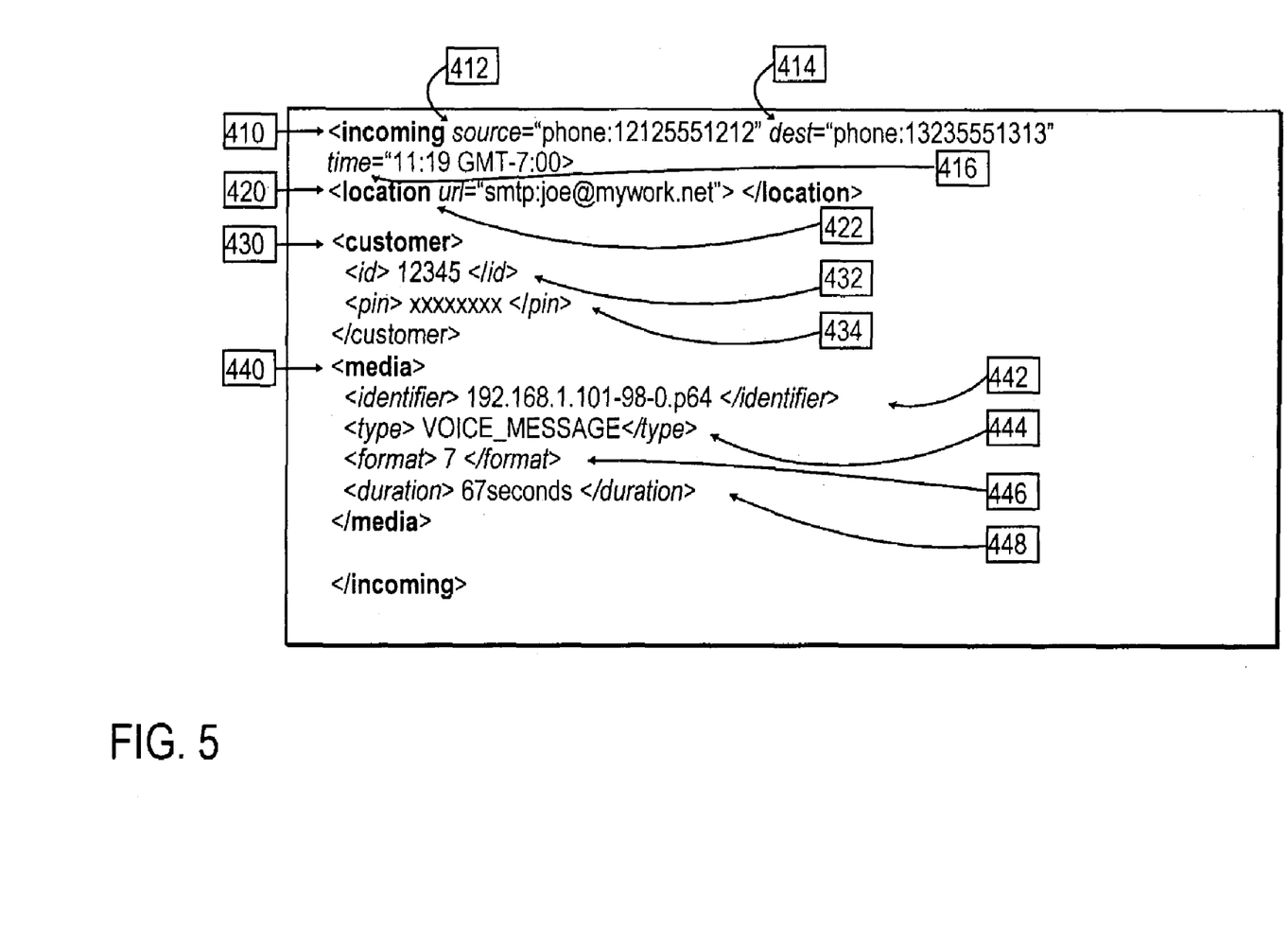
FIG. 5 illustrates how a representation language can be used for the definition of the content and structure of the message or communication and any sub-components of the message or other related communication, and characteristics for determining the disposition of a message or communication, as used by a preferred embodiment of the invention.

One of several signaling mechanisms may be used to establish communication such as those described in FIG. 3 and FIG. 4. In one embodiment, a representation language is utilized to specify information pertaining to the incoming message. Specifically, FIG. 5 illustrates use of this language. Here, a number of element tags (such as 410, 420, 430, 440, 432, 434, 442, 444, 446, 448) are used to specify specific elements of the message, along with specific attributes (412, 414, 422) that further describe each element tag. Specifically, tag 410 describes that an incoming call was received from location phone number 12125551212, with a specified destination phone number (or inbound address) of 13235551313, and that the call was received at 11:19 GMT-7:00 hours. Tag 420 specifies that the received message is required to be sent to a destination email address joe@mywork.net. There is also tag 430 which describes more information about the customer who is the intended recipient of the incoming message. This includes information such as the customer ID (tag 432), and an authentication PIN number (tag 434). Another tag 440 describes that the message received has a unique identifier "192.168.1.101-98-0.p64", and that the message is a voice message, of a pre-specified format 7, and that its duration is 67 seconds. Information described in this format provides instructions to one or more elements of the invention, allowing them to determine how best to process and route a message.

The representation language shown in FIG. 5 can also be used to determine routing and disposition of calls and messages. This aspect is described in FIG. 6, through the use of tags and attributes. Here, tag 510 describes the instructions that follow as pertaining to the handling of a call. Starting with tag 520, this tag describes that the instructions pertain to calls received on behalf of destination address 13235551313@j2.com, and that a timeout period of 7 seconds is prescribed for the following rules. Next, tag 530 describes the rules further specified within the structure of the 7-second timeout description. Here, if a call is received from phone number 12125551212 (specified by tag 532), then the call should be routed to a destination phone number 13238609200 (specified by tag 534). Otherwise, the call should be routed to destination phone 13235551313 (specified by tag 539). Further, tag 540 specifies that if the called number (also reflected in tag 520) is busy, then the incoming call should be redirected (specified by tag 542) to a destination 13235551313@commserver2.com, which may be an alternate server (or media gateway) on the data network to receive and process the call.

Figure 6:
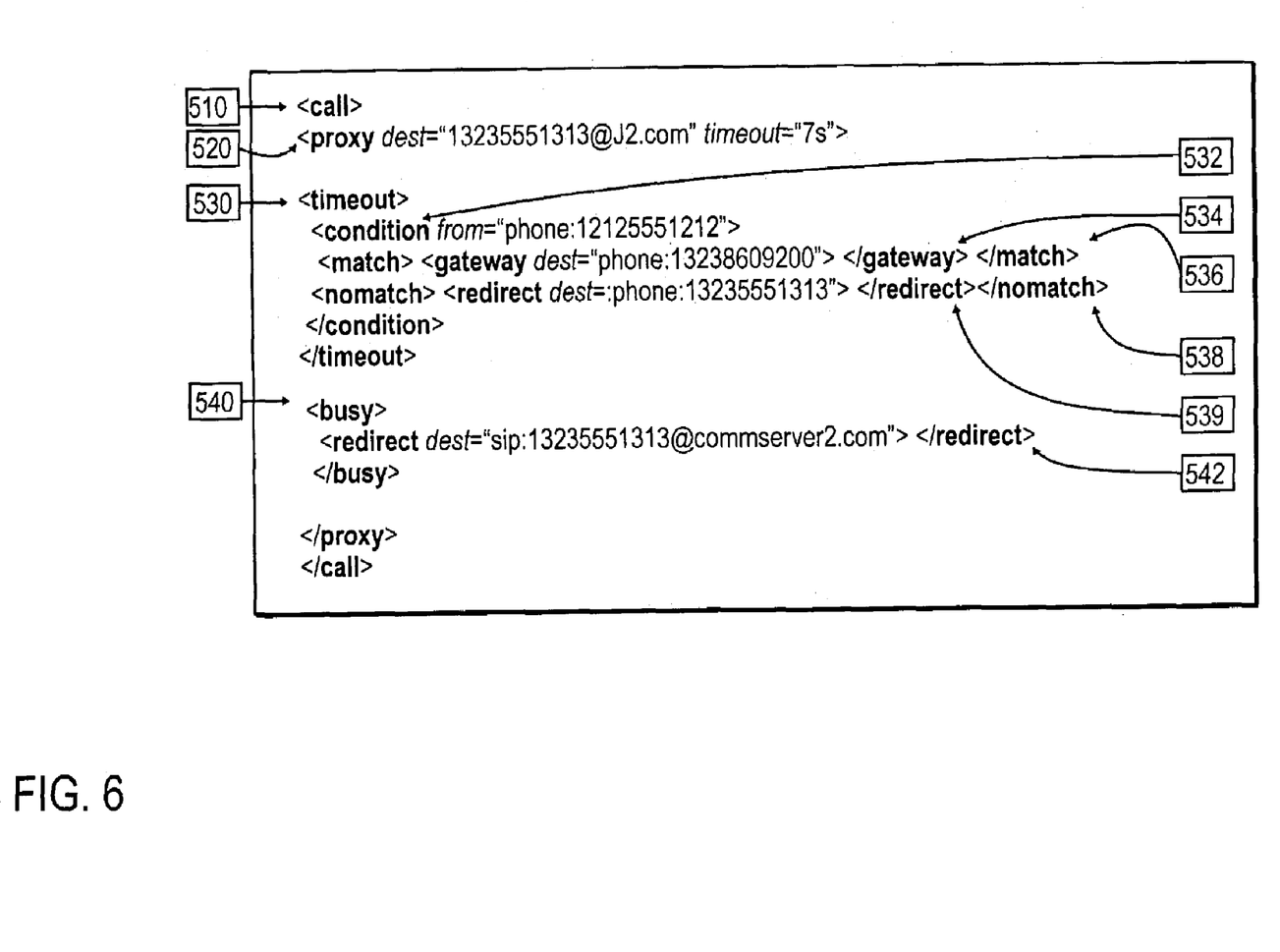
FIG. 6 illustrates how descriptive rules and representation methods can be used for determining and managing the distribution and routing of messages and other communication to one or more end-users.

Instructions of the format specified in FIG. 5 and FIG. 6, are illustrative of the representations and signaling methods used by the system of the invention.

The invention described above lies in systems and processes for communication of not just messages, but also documents, or other information or interaction between one or more networked objects on circuit and packet data networks. The means for representation of various communication types include content description and disposition rules, delivery and routing descriptions and rules, conversion and translation descriptions and rules, and methods for interactions and for administration over one or more network types, through one or more communication protocol types, to one or more destination types.

Figure 7:
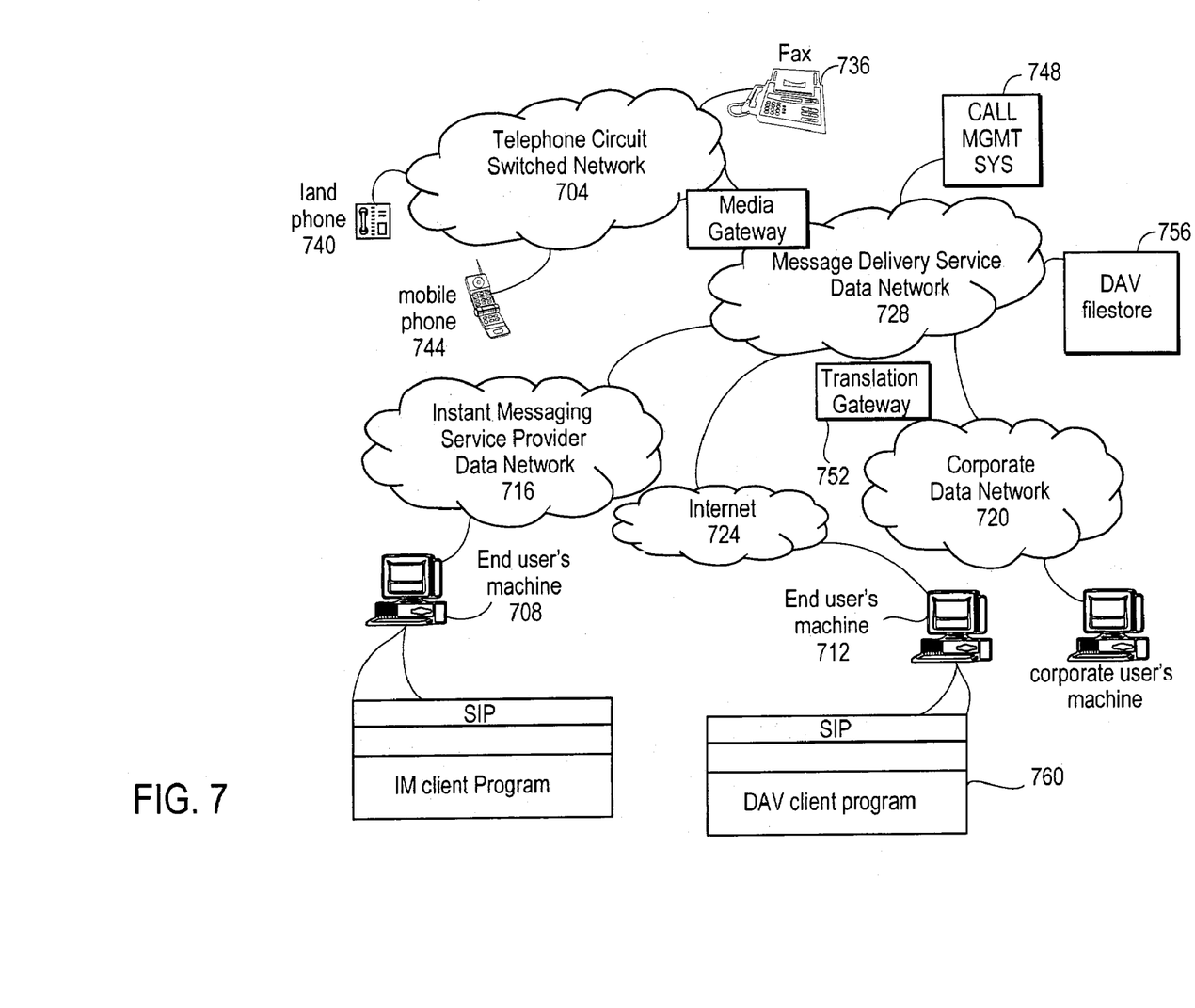
FIG. 7 shows a block diagram of another embodiment of the invention for supporting a message delivery service.

Turning now to FIG. 7, a block diagram of another embodiment of the invention for supporting a message delivery service is shown. This figure will be used to describe both inbound and outbound services, where the inbound service delivers a received voice, facsimile or other type of message, originating in a telephone circuit switched network 704, is delivered to an end user machine 708 or 712. The outbound service allows an audio, video, fax, or other type of message to originate in a data network, e.g. via an instant messaging network 716, a corporate data network 720, and a "public" data network such as the Internet 724, where the messages are then translated into a format suitable for playback or display by either a telephone, facsimile machine or other receiver that can be accessed via the telephone circuit switched network 704.

The translation between the circuit switched network 704 and the message delivery service data network 728 is performed using a media gateway 732. The media gateway 732 may digitize incoming analog phone or fax call signals. In addition, the gateway 732 may translate a message that may be received in multiple packets through the data network 728 into a format suitable for fax-tone transmission to a facsimile device 736, or suitable for transmission to a land phone or a mobile phone 744 that may not be accessible directly through the data network 728. A call management system 748 as a node of the message delivery service data network 728 serves to manage the inbound and outbound services, so that messages from incoming calls are delivered to the appropriate end user machine 708 or 712, as well as the reverse in which messages originating from an end user machine on a data network are transmitted to the non-data network receivers.

FIG. 7 also is used to describe an embodiment of the invention in which the DAV protocol, in particular, WebDAV, is used for the leg of the message delivery route that ends or originates with the end user machine. As an example, consider an incoming call signal which includes a message, directed to an inbound address of a registered end user. The media gateway 732 digitizes the message, and sends the message as a MIME e-mail message to a translation gateway 752. There, the message is further translated and sent to a DAV file store 756, in a DAV document format. An end user, via a DAV client program 760, may then access the file and play back or display the message. This assumes that the end user or her DAV client program was previously notified by the message delivery service that an inbound message has been received on her behalf. This type of notification may be performed using SIP, where a client program that has an SIP address registered with the message delivery service is contacted by a server of the message delivery service and may, for example, display a pop-up box on the end user's machine 712 stating that an incoming message has been received. The user may then instruct her client program to retrieve the message off the DAV file store 756.

Note that although in FIG. 7 the DAV file store 756 is shown as a node of the message delivery service network

728, an alternative would be to provide the DAV file store 756 as a node of the corporate data network 720. In that case, the end user's machine 712 would be a node of the corporate data network 720 and could have access to the DAV file store 756 though a secure connection maintained by the user's corporation or organization.

A further advantage of the DAV mechanism for the end-user leg of the communication path is that the tags of the mark-up language shown in FIGS. 5 and 6 (e.g. XML tags which are attached to a document that contains the message) can be reused by the DAV mechanism, as an attribute of the file containing the message. In a particular scenario, one of the XML tags may include a docket number that is conventionally used by law firms to associate a document or task with a particular client and/or matter. Thus, the end user could add the docket number as an attribute of the DAV file that contains the message which she has recognized to be associated with the docket number. In this manner, the user may search the DAV file store 756 for messages that are associated with a given docket number. This feature allows the message delivery service to provide more focused billing information to the end user, sorting the incoming and outgoing messages by their docket numbers. This feature may be very attractive for business end users, and particularly those in the legal field which need to associate each communication with a certain client and/or matter number, for purposes of billing. It can therefore be appreciated that the use of DAV in the message delivery service architecture described above provides a much more flexible interface for the end user than e-mail.

For purposes of explanation, specific embodiments were set forth to provide a thorough understanding of the present invention. However, these embodiments merely illustrate the principles of the invention. It will thus be appreciated that those skilled in the art will be able to devise various arrangements, which, although not explicitly described or shown herein, embody the principles of the invention, and are included within its spirit and scope. Furthermore, all examples and conditional language that have been recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that the block diagrams herein represent conceptual views of illustrative circuitry embodying the principles of the invention. Similarly, it will be appreciated that any flow charts, flow diagrams, pseudocode and the like represent various processes which may be substantially represented in computer readable medium and so executed by a computer or processor, whether or not explicitly shown.

The functions of the various elements shown in the figures, including functional blocks labeled as "processors" or "servers" may be provided through the use of dedicated hardware as well as hardware capable of executing software in association with appropriate software. When provided by a processor, server or computer, the functions may be provided by a single dedicated processor, by a single shared processor, or by a plurality of individual processors, some of which may be shared. Moreover, explicit use of the term "processor", "server", or "computer" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware and/or software, conventional and/or custom, may also be included.

In the claims below, any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means, which can provide these functionalities as being equivalent to those shown herein.

The invention claimed is:

1. A system comprising:
a first set of communication servers to be coupled to a first set of switches of a first circuit switched network, for receiving a first set of incoming call signals, wherein the first set of incoming call signals are from a first origin and include a first inbound address identifying a first destination or receiver of said first set of incoming call signals wherein said first set of communication servers are to be further coupled to a first data network and containing a message processing resource configured to receive and process said first set of incoming call signals into a first digital representation, wherein each communication server is coupled to said first circuit switched network to extract the first inbound address, and said message processing resource being further configured to determine, based on the first inbound address, a) a first set of attributes that define a disposition of said first set of incoming call signals and how to send the first digital representation of said first set of incoming call signals to said first destination, b) and via an instant messaging protocol whether a user is connected to the first set of communication servers by a device that can accept a message obtained from the incoming call signals.

2. The system of claim 1 wherein a switch in the first set of switches redirects said first set of incoming call signals to a second set of switches if a first condition occurs, or to a second set of communication servers if a second condition occurs, wherein said first condition occurs if one of the first set of communication servers sends a rejection signal to said first set of switches, and wherein said second condition occurs if one of the first set of communication servers sends a redirection signal to said first set of switches causing said first set of switches to redirect said first set of incoming call signals to a predefined second communication server, or to a third communication server defined by said one of the first set of communication servers, or to a third communication server in the event of said first or second communication server being unable to process said first set of incoming call signals.

3. The system of claim 1 further comprising a first call management unit that contains one of (1) a static or dynamically assignable set of first inbound addresses and (2)

attributes that define the rules for direction of said first set of incoming call signals to any one of a plurality of communication servers, said first call management unit further determining said attributes from within a local repository of attribute information or through another repository accessible over a network.

4. The system of claim 3, wherein said first call management unit is part of one of a router, a proxy server, a location server, a directory server, and a database server.

5. The system of claim 3 wherein said first call management unit provides the functionality to re-direct said first set of incoming signals or related communication to destinations different from those that may have been specified within the first inbound address or first set of attributes, said first call management unit further providing the functionality to forward, record, and manage a signal or communication between an origin and a destination of said first set of incoming call signals or related communication.

6. The system of claim 3 wherein said first call management unit acts on behalf of one of a communication server, an origin, and a destination, to process said first set of incoming signals or related communication, (a) for purposes of maintaining communications intentionally requested by said origin, destination, or communication server, and (b) in the event of a network loss of connectivity to origin, destination, or communication server, and (c) for purposes of one of recording, archiving, administration, billing, management, supervision, and control.

7. The system of claim 3 wherein some of said first set of incoming signals or related communication are carried over a first set of networks or protocols, and a remainder of said first set of incoming signals or other related communication are carried a second set of networks or protocols, with one of said first set of communication server and call management system coordinating interactions between the different networks and protocols.

8. The system of claim 3 wherein said first set of incoming call signals or related communication from an origin is delivered to a first destination, wherein the first destination sends a second communication to one of the origin and a communication server that the delivery was completed, along with details pertaining to the delivery, said second communication being further archived, manipulated, transformed, distributed, or otherwise disposed of in a manner dictated by a set of attributes defined by one of said origin, said destination, and a communication server, said second communication further containing a part of a message contained in the first set of incoming signals or part of said related communication.

9. The system of claim 3, wherein the session initiation protocol (SIP) is used for establishing the identity and authenticity of an origin and destination of said first set of incoming call signals, and to determine a route for a message contained in the first set of incoming call signals, and being further used for establishment, monitoring, administration, logging, proxy, billing, and delivery of said message.

10. The system of claim 3, wherein one of said first circuit network and said first data network contains an element of directory information that can identify the location of an origin or destinations of said first set of incoming call signals, said element to provide information about attributes or addresses that further facilitate the establishment and management of communication using the system, said directory containing information pertaining to identity, authenticity, communication protocols or communication device specific information, user profile information, and other attributes relevant to the establishment or handling of said first set of incoming call signals.

11. The system of claim 3, wherein communication between communication servers, the call management unit, and the first origin is accomplished through the use of markup languages or other structured representations of rules and directives, and methods for exchange of attributes or communication signals pertaining to the first set of incoming call signals or other attributes specific to the first origin, first destination, network, communication protocol, communication server or call management unit involved in the communication of said first set of incoming call signals.

12. The system of claim 11 wherein said markup language is the Extensible Markup Language (XML).

13. The system of claim 11, wherein said attributes are exchanged using Simple Object Access Protocol (SOAP).

14. The system of claim 11, wherein some of said attributes or communication of said first set of incoming call signals require the discovery, description or interface specification of the information being communicated, wherein said description is provided through the use of a Universal Description, Discovery and Interface (UDDI) specification.

15. The system of claim 11, wherein some of said attributes or communication are exchanged using an electronic business protocol being one of EDI and ebXML.

16. The system of claim 11 wherein the Call Processing Language is used for the representation of signaling, routing, and call control information.

17. The system of claim 1 wherein said first set of said first circuit network and said first data network comprises a connection over one of a voice-over-IP network 2.5G and 3G wireless network.

18. The system of claim 1 wherein said first set of incoming call signals comprises communication transmitted over a plurality of different networks and protocols.

19. The system of claim 1 wherein said first inbound address includes one of a telephone number, an Internet address, an SIP address, a Universal Resource locator or identifier, a globally unique identifier, a pointer to a location or repository of address, and a pointer to a hierarchy or other logical, structured or unstructured, collection or combination of addresses.

20. The system of claim 1 wherein one said first set of attributes defines a set of rules for filtering or conversion of said first set of incoming signals into a format suitable for delivery to a set of destinations via a set of networks and a set of communication protocols.

21. The system of claim 1 wherein first set of incoming call signals and said first inbound address are used to verify the authenticity of an intended recipient of said first incoming call signals or related communication through a lookup or computation in said first set of communication servers or repository accessible over a network.

22. The system of claim 21 further comprising a mechanism for encryption of said first set of incoming signals or related communication, for transport between said first set of communication servers and one or more destinations.

23. The system of claim 22 further comprising a trusted source on the data network that maintains a set of encryption keys and a method for management and distribution of keys between communication servers, and between origins and destinations of said first set of incoming signals.

24. The system of claim 1 wherein said first set of incoming call signals includes one of an audio message, a facsimile message, a video message, a textual or other data representation, a software agent or component, a voice call, a video call, a datagram, and an instant message.

25. The system of claim 1 wherein one of said first set of incoming signals related communication, and any digital representation of the same, is carried over a network using one of Internet protocols TCP, UDP, RTP, IP, IPX, and IP tunneling, and using one of a secure transmission, authentication and encryption protocols including IPsec, and using one of signaling protocols including SIP and SS7, and using one of transport and presentation protocols including HTTP, secure HTTP, WAP, WML, XML, XML based communication protocols including SOAP, UDDI, ebXML, BizTalk, and using one of communication protocols including POP, IMAP, SMIP, Internet Relay Chat.

26. The system of claim 1 wherein one of said first set of incoming signals and related communication is carried over said first data network using structured communication protocol utilizing one of (a) static or dynamically assigned network ports and (b) other physical or logical communication channels.

27. The system of claim 1 wherein one of said first incoming signal and related communication is carried over said first data network using structured signaling and messaging methods.

28. The system of claim 1 wherein one of said first circuit network and said data network are comprised in part of a 2.5G or 3G wireless network infrastructure, an Authentication, Authorization, and Accounting server (AAA) of said 3G network to establish part of a set of attributes pertaining to the establishment and maintenance of communication between an origin and a destination of said first incoming call signal, with support nodes (SN) of said 2.5G or 3G system for purposes of obtaining or communicating handover and location information, authenticity, security and routing information relevant to communication between said origin and said destination and another element of the network pertaining to said first set of incoming call signals.

29. The system of claim 1 wherein one of said first set of communication servers has a message processing resource that employs a text-to-speech interface for conveying textual representations of information via a voice or audio representation to an origin or destination, for purposes of delivery of a message or communication.

30. The system of claim 1 wherein one of said first set of communication servers uses a message processing resource that employs a voice recognition interface for purposes of processing a digital representation of an incoming call signal between an origin and destination, said resource to translate and recognize spoken voice utterances into a machine readable form that can be further manipulated, transformed and communicated with one or more elements of a network involved in the process of communication of said first set of incoming call signals.

31. The system of claim 30 wherein a markup language is used for the representation of structured voice information and related data information, said voice information comprising a) digitized voice representations or voice representations produced as a result of text-to-speech conversions, and further b) signaling and call control information pertaining to the direction, disposition, or administration of said first set of incoming call signals wherein said voice information or said signaling and call control information is obtained from either said first set of communication servers or any element accessible on the first data network.

32. The system of claim 31 wherein said markup language is Voice XML (VXML).

33. The system of claim 1 wherein one of said first set of communication servers uses a message processing resource that employs optical character recognition (OCR) for purposes of converting digitized image representations of said first set of incoming signals or related communication into another machine readable, textual or other representation format.

34. A system for supporting a message delivery service, comprising:
a media gateway to process one or more signals, associated with an incoming call, from a telecommunications switch into a digital representation, and extract from one or more of the signals an inbound address and a message being one of a voice message and a fax message;
a call management system to communicate with the media gateway, to verify that the inbound address is that of an authorized customer of the message delivery service and determine based on the inbound address a set of attributes that indicates a destination for delivering the message, and determine whether the authorized customer can accept the message via an instant messaging protocol; and
a communication server to communicate with the call management system and the authorized customer, to initiate the sending of the message to the user via said instant messaging protocol.

35. The system of claim 34 wherein each of the media gateway, call management system, and communication server is associated with a different node of a data network and communicate with each other via the data network.

36. The system of claim 35 wherein the call management system is to verify the inbound address and determine the set of attributes by accessing one of a local repository and a remote repository, the remote repository being associated with another node of the data network.

37. The system of claim 36 wherein the call management system is to obtain the authorized customer's instant messaging (IM) and IM network identification by accessing said local repository or said remote repository, prior to signaling the communication server to initiate sending the message to the authorized customer via the instant messaging protocol.

38. The system of claim 37 wherein the call management system directs the communication server to initiate sending of the message to an email address, in response to a request from the authorized customer via the instant messaging protocol.

39. The system of claim 35 wherein the call management system has the functionality of one of a router, a proxy server, a location server, a directory server, and a database server.

40. The system of claim 35 wherein the message is encapsulated with said set of attributes that further includes a set of rules for one of filtering the digital representation and converting the message into a format suitable for delivery to one of a plurality of different destinations, said set of attributes being described using a representation language.

41. The system of claim 40 wherein the communication server acts as a translation gateway to convert the message into the format suitable for delivery to its destination.

42. The system of claim 34 wherein said set of attributes includes one of an Internet address, a Session Initiation Protocol (SIP) address, a Universal Resource Locator (URL), a pointer to a location of addresses, and a pointer to a location of attributes.

43. The system of claim 42 wherein said set of attributes includes a set of rules for one of filtering the digital representation, and converting the message into a format suitable for delivery to one of a plurality of different destinations.

44. The system of claim 34 wherein the media gateway, call management system, and communication server are associated with one or more nodes of a private data network of the message delivery service and communicate with each other via the private data network, and the communication server is to encrypt the message prior to sending the message to its destination via a hostile data network.

45. The system of claim 44 wherein the private data network is a virtual private network, one of the media gateway, the communication server, and the call management system being associated with a node of the virtual private network.

46. The system of claim 44 further comprising:
a trusted source that maintains a plurality of encryption keys and distributes one of the plurality of keys to the communication server for use in encrypting the message.

47. The system of claim 46 wherein the trusted source is accessible by the communication server and is associated with a node of the private data network.

48. A system for supporting a message delivery service, comprising:
a call management system to communicate with a media gateway, to verify that an incoming fax or voice call to the media gateway is for an authorized customer of the message delivery service and determine a set of attributes of the authorized customer's account that indicate a destination for delivering a message contained in the incoming fax voice call, and determine whether the authorized customer can accept the message via a distributed authoring and versioning protocol; and
a communication server to communicate with the call management system and the authorized customer, to initiate the sending of the message to the customer via said protocol.

49. The system of claim 48 wherein the message is encapsulated with said set of attributes that further includes a set of rules for converting the message into a format suitable for delivery to one of a plurality of different destinations, said set of attributes being described using a representation language.

50. The system of claim 49 wherein the communication server is to receive the message from the media gateway via an e-mail attachment.

51. The system of claim 49 wherein the communication server is to translate the message into a format suitable for storage as part of a DAV file and initiate the storage of the message, along with some of said set of attributes, in a DAV file store that is accessible by a client program of the customer.

52. The system of claim 51 wherein said set of attributes include an identification of the customer and a docket number that associates the message with a client of the customer.

53. The system of claim 48 wherein each of the media gateway, call management system, and communication server is associated with a different node of a data network and communicate with each other via the data network.

54. The system of claim 48 wherein call management system, and communication server are associated with one or more nodes of a private data network of the message delivery service and communicate with each other via the private data network, and the communication server is to encrypt the message prior to sending the message to its destination via a hostile data network.

55. The system of claim 54 wherein the private data network is a virtual private network, one of the communication server and the call management system being associated with a node of the virtual private network.

56. The system of claim 54 further comprising:
a trusted source that maintains a plurality of encryption keys and distributes one of the plurality of keys to the communication server for use in encrypting the message.

57. The system of claim 56 wherein the trusted source is accessible by the communication server and is associated with a node of the private data network.

58. A method for supporting a message delivery service, comprising:
receiving a first set of incoming call signals that include an inbound address of a customer of the message service and a message being one of an audio and facsimile message;
determining, based on the inbound address, a set of attributes that describe how to process the message and how to deliver the message to its destination;
encapsulating some of said set of attributes using a markup language together with the message; and
delivering the message to its destination via a network, using said set of encapsulated attributes to define a path through the network.

59. The method of claim 58 wherein the inbound address includes one of a telephone number, an Internet address, an SIP address and a universal resource locator.

60. The method of claim 58 wherein the set of attributes defines rules for one of filtering and conversion of the first set of incoming signals into a format suitable for delivery of the message to its destination.

61. The method of claim 60 where the set of attributes further include encrypting information for encrypting the message in preparation for transport over a hostile data network, on the way to its destination.

62. The method of claim 58 further comprising:
verifying the authenticity of an intended recipient of the set of first incoming call signals.

* * * * *

UNITED STATES PATENT AND TRADEMARK OFFICE
CERTIFICATE OF CORRECTION

| | | |
|---|---|---|
| PATENT NO. | : 7,245,611 B2 | Page 1 of 1 |
| APPLICATION NO. | : 10/374629 | |
| DATED | : July 17, 2007 | |
| INVENTOR(S) | : Anand Narasimhan | |

It is certified that error appears in the above-identified patent and that said Letters Patent is hereby corrected as shown below:

In Column 11, claim 25, line 12, please delete "SMIP" and insert -- SMTP --.

In Column 13, claim 48, line 31, please insert -- or -- after "fax" and before "voice".

Signed and Sealed this

Twenty-first Day of July, 2009

JOHN DOLL
*Acting Director of the United States Patent and Trademark Office*